United States Patent Office 3,849,515
Patented Nov. 19, 1974

3,849,515
PROCESS FOR THE PREPARATION OF POLY-
ETHER/POLYESTER BLOCK COPOLYMERS
Erwin Muller, Leverkusen, Germany, assignor to Bayer
Aktiengesellschaft, Leverkusen, Germany
No Drawing. Filed Feb. 23, 1973, Ser. No. 335,266
Claims priority, application Germany, May 7, 1972,
P 22 10 839.0
Int. Cl. C08g 39/10
U.S. Cl. 260—860
10 Claims

ABSTRACT OF THE DISCLOSURE

A novel process is provided which permits the preparation of polyether/polyester block copolymers which comprises condensing in the presence of an etherification catalyst at a temperature above 130° C., hydroxyl polyesters and hydroxyl polyethers each containing free hydroxyl groups.

---

Polyethers which contain carboxylic acid ester groups are well known. They may be prepared, for example, by esterifying glycols which contain ether groups, e.g. di-, tri- or tetraethylene glycol, with dicarboxylic acids e.g. adipic acid. It is not possible to link polyethers with terminal OH groups by heating in the presence of etherification catalysts, because the starting materials do not continue to form ether bonds to yield high molecular weight end products but give rise to degradation products with the elimination of water, the main degradation products being unsaturated ethers with terminal double bonds. In the presence of polyesters, hydrolytic or alcoholytic reactions would also be expected to take place.

It has now surprisingly been found, however, that block copolymers which contain terminal hydroxyl groups can be obtained easily and in high yields from polyester and polyether segments by reacting mixtures of polyesters which contain hydroxyl groups and polyethers which contain hydroxyl groups in the presence of catalytic quantities of etherification catalysts. The linkage of the polyester and polyether segments takes place via ether groups with the elimination of water and the formation of polyester-polyethers which contain hydroxyl groups. The products obtainable by the process according to the invention therefore have e.g. the following constitution:

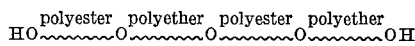

The linkage of polyesters and polyethers which contain hydroxyl end groups via ether groups depends on the end groups of the polyesters or polyethers having a certain reactivity to enable ether formation to take place. Polyesters and polyethers of which at least one component has the following end groups:

—O—CH$_2$—CH—OH   R=H, CH$_3$
         |
         R

—O—(CH$_2$)$_n$—OH   n=3–6 are particularly suitable.

This invention thus relates to a process for the preparation of block copolymers by the condensation of polyesters which contain hydroxyl groups and polyethers which contain hydroxyl groups in which mixtures of these susbtances are heated to temperatures above 130° C., preferably 130 to 220° C., in the presence of catalytic quantities of etherification catalysts.

Polyesters suitable for the process of the invention are, for example, polyesters of ethylene glycol and adipic acid,
1,2-propylene glycol and adipic acid,
di- and poly-propylene glycol and adipic acid,
di- and polyethylene glycol and adipic acid, or
butane-1,4-diol and adipic acid.

Instead of adipic acid polyesters of phthalic acid, terephthalic acid, succinic acid, sebacic acid or azelaic acid or mixed esters of these acids may also be used as well as polyesters based on caprolactone or polyesters or polycarbonates of hexane-1,6-diol. Particularly suitable polyethers for the process of the invention are hydroxyl-containing polypropylene-polybutylene and polyethylene ethers known *per se*.

The molecular weight of the various polyesters may vary between 250 and 3000 and should preferably be about 800–1000. The polyethers should have a molecular weight of 500 to 3000 and preferably about 800 to 2000.

The polyesters and polyethers are reacted together in a molar ratio of between 5:1 and 1:5, preferably between 2:1 and 1:2 and in particular also in equimolar proportions.

The polyesters and polyethers to be used for the process according to the invention preferably contain two terminal hydroxyl groups.

In carrying out the process of the invention, mixtures of the polyhydroxyl compounds to be used according to the invention are heated to temperatures above 130° C., preferably between 150° C. and 220° C., preferably at a pressure of about 0.1 to 200 mm. Hg, with stirring, for 5 to 25 hours, preferably 10 to 20 hours, in the presence of etherification catalysts, preferably in an inert atmosphere of nitrogen and the like and with the continual elimination of the water of condensation.

The etherification catalysts used may be known compounds, particularly sulphuric acid, e.g. concentrated sulphuric acid, or organic sulphonic acids, e.g. toluene sulphonic acid, benzene sulphonic acid, naphthalene sulphonic acid or methane disulphonic acid, or sulphonic acid halides, e.g. sulphonic acid chlorides. Sulphuric acid and organic sulphonic acids are particularly preferred.

The etherification catalysts are generally used in quantities of 0.001 to 1 percent by weight, preferably 0.004–0.01 percent by weight, based on the polyhydroxyl compounds. At the end of the process according to the invention, they may be inactivated in known manner, e.g. by neutralization with barium carbonate or other known neutralizing agents, preferably those which form sparingly soluble salts with the catalysts.

The products according to the invention have molecular weights of between 2000 and about 100,000, depending on the choice of reaction conditions. The products obtained are either viscous oils or substances with a waxy consistency or products with elastic properties, depending on their molecular weight and composition. With suitable choice of starting components it is also possible to produce elastic synthetic resins with various degrees of hardness, especially those based on terephthalic acid.

The products of the process, which still contain a substantial proportion by weight of free hydroxyl groups, varying according to their molecular weight, can be reacted in known manner with polyisocyanates, optionally in the presence of chain-lengthening agents such as polyols, polyamines and water. The polyurethanes produced have improved low temperature properties. Depending on the methods by which they have been produced, they may be used as elastomers, adhesives, foams or migration-resistant plasticizers for polyvinyl chloride.

The invention is further illustrated but is not intended to be limited by the following examples in which all parts and percentages are by weight unless otherwise specified.

The following examples service to explain the process of the invention.

EXAMPLE 1

635 g. of a polyester of ethylene glycol and adipic acid (OH-number 177) (1 mol) and 700 g. of polypropylene ether glycol (OH-number 160) (1 mol) are introduced into a flask fitted with a descending condenser.

The reaction mixture is first dehydrated with stirring at 130° C./12 mm. Hg and 0.035 cc. of concentrated sulphuric acid is then introduced into the anhydrous melt at about 100° C. under a current of nitrogen. The temperature is then gradually raised to 220° C., when the elimination of water due to etherification sets in. After 9 hours at 220° C./0.4 mm. Hg the OH number was found to be 84 and the acid number 0.17. After a further 8 hours condensation at 220° C./0.4 mm. Hg, the OH-number was 57.8 and the acid number 0.4. The total amount of distillate obtained was 23 g. The sulphuric acid in the condensation product is neutralized by adding 0.3 g. of barium carbonate with stirring, and the product is left to cool. The waxy condensation product has a softening point of 28° C. Yield: 1300 g.

EXAMPLE 2

500 g. of polytetrahydrofuran, OH-number 110 (0.5 mol),
315 g. of polyester of ethylene glycol and adipic acid, OH-number 177 (0.5 mol) and
0.02 cc. of conc. $H_2SO_4$ are reacted together under the conditions indicated in Example 1.

After the addition of sulphuric acid the reaction mixture, which is at first non-homogeneous, becomes clear at 190° C./0.1 mm. Hg. After condensation for 4 hours at 205° C./0.05 mm. Hg, the OH-number was found to be 31 and the acid number 0.7. After a further 5 hours at the same temperature and the same pressure, the OH number was 15.2 and the acid number 1.2. The total amount of distillate obtained was 18 g. The waxy condensation product has a softening point of 32° C. Yield: 780 g.

1 kg. of polyester of ethylene glycol and adipic acid, OH-number 56, acid number 0.6 (0.5 mol),
800 g. of polyethylene oxide, OH-number 68 (0.5 mol) and
0.04 cc. of conc. $H_2SO_4$ were reacted together under the conditions indicated in Example 1.

An OH-number of 27.5 and acid number of 0.5 were reached after 12 hours at 215–220° C./13 mm. Hg. The condensation product is a water-soluble wax with a softening point of 31° C. The aqueous solution has a turbidity point at 45° C. Yield: 1750 g.

EXAMPLE 4

415 g. of a polyester of hexane-1,6-diol and adipic acid, OH-number 136 (0.5 mol),
800 g. of polyethylene ether glycol, OH-number 768 (0.5 mol) and
0.03 cc. of conc. $H_2SO_4$ are reacted together under the conditions indicated in Example 1.

An OH-number of 55.1 and acid number of 0.4 were reached after 18 hours at 220° C./15 mm. Hg. The condensation product is a viscous, water-soluble product with a turbidity point at 92° C. The quantity of distillate was 44 g.

EXAMPLE 5

550 g. of a polyester of butane-1,4-diol and adipic acid, OH-number 51 (0.25 mol)
250 g. of polytetrahydrofuran, OH-number 110 (0.25 mol) and
0.025 cc. of conc. $H_2SO_4$ were reacted together under the conditions indicated in Example 1.

After the addition of sulphuric acid, the reaction mixture, which is at first non-homogeneous, becomes homogeneous at 190 C. About 10 g. of distillate are obtained in the course of condensation. The time of condensation is about 5 hours.

A pale, waxy condensation product with OH-number 20.0, acid number 0.5 and softening point 40° C. was obtained after neutralization of the sulphuric acid by stirring 0.2 g. of barium carbonate into the product. Yield: 780 g.

EXAMPLE 6

650 g. of a polyester of diethylene glycol and adipic acid, OH-number 43, acid number 0.6 (0.25 mol),
200 g. of polypropylene ether glycol, OH-number 140 (0.25 mol) and
0.025 cc. of conc. $H_2SO_4$ were reacted together under the conditions indicated in Example 1.

After 13 hours at 210–220° C./15 mm. Hg, the OH-number was found to be 25 and the acid number 1. The condensation product is a viscous, water-insoluble oil. The total amount of distillate obtained was 8 g. Yield: 830 g.

EXAMPLE 7

100 g. of polyethylene ether glycol, OH-number 68 and
100 g. of β-hydroxyethyl terephthalate, OH-number 68, were reacted together under the conditions indicated in Example 1 after the addition of one drop of concentrated sulphuric acid. Condensation carried out for 10 hours at 220° C./15 mm. Hg was accompanied by a continuous increase in the viscosity of the melt and yielded 22 g. of distillate. When condensation had been carried out for a further 8 hours at 220° C./0.2 mm. Hg, a highly viscous melt was obtained which had an OH-number of 2 and which changed on cooling into an elastic synthetic resin which could be thermoplastically formed at temperatures above 150° C. Yield: 170 g.

EXAMPLE 8

1 kg. of a polyester of diethylene glycol and caprolactone, OH-number 56, acid number 0.3 (0.5 mol)
800 g. of polyethylene oxide, OH-number 68 (0.5 mol) and
0.04 cc. of conc. $H_2SO_4$ were reacted together under the conditions indicated in Example 1.

An OH-number of 27.5 and acid number of 0.2 were reached after 12 hours at 215–220° C./13 mm. Hg. The condensation product is a water-soluble wax with a softening point of 31° C. The aqueous solution has a turbidity point at 45° C. Yield: 1750 g.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the preparation of polyether/polyester block copolymers which comprises condensing, in the presence of an etherification catalyst at a temperature 130° C.–220° C., hydroxyl saturated polyesters and hydroxyl polyethers each containing free hydroxyl groups, said polyester has a molecular weight of 250–3000 and said polyether has a molecular weight of 500–3000, the molar ratio of polyester to polyether being from about 5:1 to about 1:5.

2. The process of Claim 1 wherein said temperature is from about 150° C. to about 220° C.

3. The process of Claim 2 wherein said etherification catalyst is present in an amount of about 0.001 to about 1.0 percent by weight of the polyester and polyether reactants.

4. The process of Claim 2 wherein said reaction is carried out for about 5 to about 25 hours.

5. The process of Claim 2 wherein the molar ratio of polyester to polyether is from about 2:1 to about 1:2.

6. The process of Claim 1 wherein said polyester and said polyether contain end groups of the formula

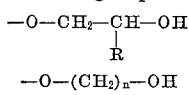

$$-O-(CH_2)_n-OH$$

wherein R is hydrogen or methyl and $n$ is 3–6.

7. The process of Claim 1 wherein said ether catalyst is sulphuric acid or p-toluene sulphonic acid.

8. The process of Claim 1 wherein said hydroxyl polyester is based on adipic acid.

9. The process of Claim 1 wherein said polyester is based on caprolactone.

10. The process of Claim 1 wherein said polyester is based on adipic acid or caprolactone and ethylene glycol, hexane-1,6-diol, butane-1,4-diol, or diethylene glycol.

References Cited
UNITED STATES PATENTS 3,652,713  3/1972  Okazaki et al. _____ 260—860
3,600,460  8/1971  Brinkmann et al. ____ 260—860

MELVIN GOLDSTEIN, Primary Examiner

T. E. PERTILLA, Assistant Examiner

U.S. Cl. X.R.
260—75 R, 75 T